March 5, 1963 J. J. BLUMENKRANZ ET AL 3,080,060
FILTER UNIT FOR SWIMMING POOL
Filed July 7, 1958 2 Sheets-Sheet 1

INVENTORS
JAMES J. BLUMENKRANZ
RICHARD O. LIGHTFOOT
BY Forrest J. Lilly
Attorney March 5, 1963 J. J. BLUMENKRANZ ET AL 3,080,060
FILTER UNIT FOR SWIMMING POOL
Filed July 7, 1958 2 Sheets-Sheet 2
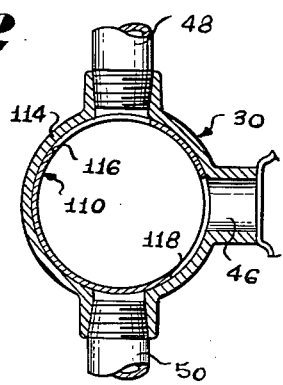
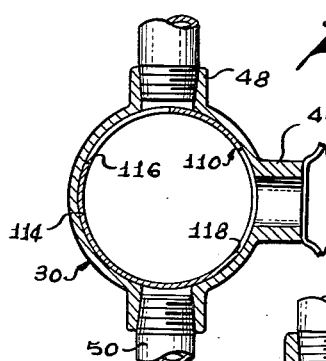
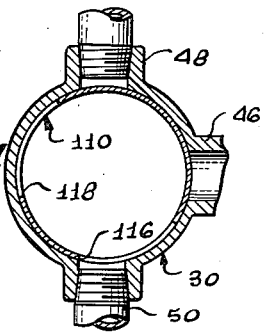
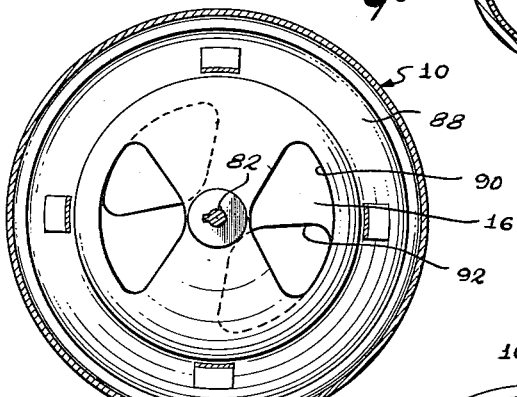
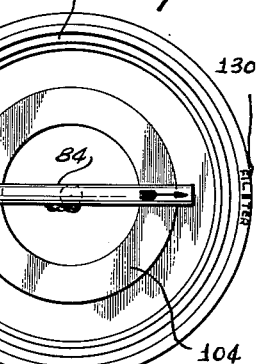
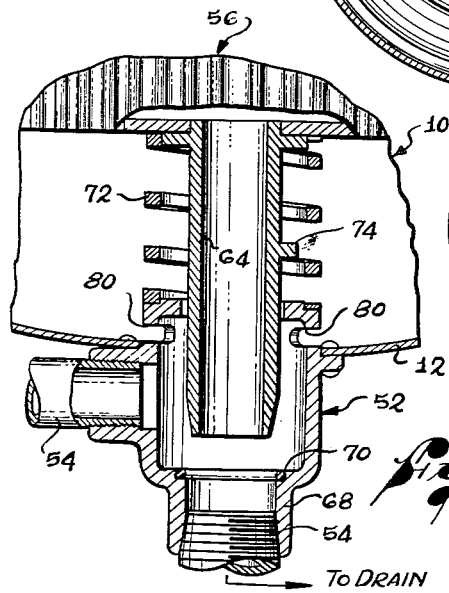
INVENTORS
JAMES J. BLUMENKRANZ
RICHARD O. LIGHTFOOT
BY Forrest J. Lilly
Attorney

United States Patent Office 3,080,060
Patented Mar. 5, 1963

3,080,060
FILTER UNIT FOR SWIMMING POOL
James J. Blumenkranz and Richard O. Lightfoot, Los Angeles, Calif., assignors to Paddock Pool Equipment Co., Los Angeles, Calif., a corporation of California
Filed July 7, 1958, Ser. No. 746,840
9 Claims. (Cl. 210—169)

This invention relates to a water filtering system, and more particularly to a filter unit for swimming pools and the like.

This invention may be considered to be an improvement on the filters disclosed in co-pending applications Serial No. 733,109, filed May 5, 1958 and now Patent No. 2,914,180, and entitled, Filter for Swimming Pools and The Like, and Serial No. 733,110, filed May 5, 1958 and now Patent No. 2,979,206, and entitled, Swimming Pool Filter.

Briefly stated, the invention provides a filter unit equipped with a vertical filter tank. The lower end of this tank has an outlet for connection to the suction side of a pump. Located within the filter tank, with its interior communicating with the outlet, is a permeable filter element. The lower end of the tank is also provided with a water inlet. Water entering this inlet flows upwardly through the tank, through the permeable wall or membrane of the filter element, and then downwardly through the latter to the tank outlet.

The filter unit has three inlets communicating with this lower inlet of the filter tank through a common selector valve and strainer assembly. This assembly includes a combined selector and proportioning valve for regulating water flow through the inlets and a single strainer basket through which all water entering through the three inlets flows.

In a swimming pool installation of the filter unit, the first or skimmer inlet is located at the normal water level of the pool, the second or pool inlet connects to the main outlet in the bottom of the pool, and the third inlet connects to a vacuum fitting in the pool side wall. Water entering the filter unit through the first inlet flows over a surface skimmer, through the valve and strainer assembly, to the filter tank intake. Water entering the filter unit through the second and third inlets, on the other hand, flows directly into the valve and strainer assembly and then to the filter tank inlet.

In normal operation of the filter unit, the combined selector and proportioning valve is set to close only the vacuum fitting inlet. Water is then drawn into the filter tank from the surface skimmer and main pool outlet. It is desirable, for the reasons discussed in the aforementioned co-pending application, Serial No. 733,110, that the flows of water to the filter tank from the surface skimmer and main pool outlet during such normal operation be capable of regulation or proportioning. The combined selector and proportioning valve of the unit is designed to accomplish this regulation.

In a pool vacuuming operation, the selector and proportioning valve is set to close the surface skimmer and pool inlets of the filter unit and to open the vacuum fitting inlet. Under these conditions, the vacuum created in the filter tank during operation of the filter pump causes water to be drawn into the tank through a vacuum cleaner connected to the vacuum fitting.

The filter element within the filter tank is a hollow structure, the interior of which, as already noted, communicates with the lower outlet of the filter tank. This filter element has an outer permeable wall or membrane through which the water entering the filter tank from the three filter inlets flows to the interior of the filter element and thence to the outlet of the filter tank. The membrane has an external coating of diatomaceous earth or other suitable filter aid which serves to remove or filter out foreign matter from the water.

This foreign matter gradually accumulates and restricts the flow of water through the filter element. During prolonged usage, therefore, the efficiency of the filter element gradually diminishes. Accordingly, it is necessary to periodically wash off the exterior of the filter element.

To this end, the filter tank has a fourth upper inlet provided with a valve which may be opened to admit water to the upper end of the tank. Also, a releasable connection of the general character disclosed in co-pending application Serial No. 733,109 is provided between the filter element and filter tank outlet. As discussed more fully in this latter co-pending application, this connection may be released to by-pass the filter element. Water can then flow over the outside of the filter element directly to the outlet of the filter tank for purposes of washing off the exterior of the element. The present selector and proportioning is so designed that it may be set to close the skimmer and pool inlets during a filter washing operation (the vacuum fitting being closed by a plug) so that all water flow to the filter tank occurs through its upper end.

One important feature of the present filter unit resides in the novel selector and proportioning valve. This valve enables an appreciably simplified and less costly filter unit.

A second important feature of the present filter unit has to do with the upward direction of water flow into the filter tank. As mentioned, the filter element is provided with an external coating of suitable filter aid which effects the actual filtering action of the element. Each time the filter is shut off, some of this filter aid separates from the filter element and settles to the bottom of the filter tank.

The present improved filter unit is designed so that during operation water enters the filter tank at its bottom and flows upwardly to the filter element. During its upward flow through the tank, the water picks up the cake of filter aid from the bottom of the filter tank and redeposits it on the filter element.

This redeposition action is advantageous for the reason that an optimum layer of filter aid is maintained on the filter element for a longer period of time, and, more importantly, it results in a periodic breaking up of the layer of foreign matter which accumulates on the element. If this layer were not so broken up it would rapidly reduce the efficiency of the filter. It has been determined by experiment that the redeposition action involved in the operation of the present filter unit increases the length of the filter run several times.

With the foregoing preliminary discussion in mind, a broad object of the present invention may be stated as being the provision of a new and improved filter unit for swimming pools and the like.

A more specific object of the invention is the provision of a filter unit of the character described which embodies a unique and simplified selector and proportioning valve for setting the unit for its several modes of operation as well as regulating or proportioning water flow through the unit in certain of these modes.

Another object of the invention is the provision of a filter unit of the character described wherein a single selector and proportioning valve serves both as a shut-off valve for selectively closing the pool, skimmer and vacuum fitting inlets of the unit and as a regulating valve for proportioning the flow of water to the filter tank through the skimmer pool inlets during normal operation.

Yet another object of the invention is the provision of a filter unit of the character described which is uniquely designed to prolong the length of the filter run.

A further object of the invention is the provision of a filter unit of the character described wherein water enters the filter tank through its bottom in such a way as to pick up any filter aid which separates from the filter element during periodic shut-downs of the unit and redeposit the aid on the filter element.

A further object of the invention is the provision of a filter unit of the character described wherein the parts of the unit are arranged for ease of accessibility and manipulation.

A still further object of the invention is the provision of a filter unit of the character described which is relatively simple in construction, inexpensive to manufacture, and otherwise especially well suited to its intended purpose.

Other objects, advantages and features of the invention will become readily apparent as the description proceeds.

A better understanding of the invention may be had from the following detailed description thereof, taken in connection with the annexed drawings, wherein:

FIGS. 2–4 are section views of the selector and proportioning valve embodied in the unit in three different positions of operation;

FIG. 5 is a section taken along line 5—5 of FIG. 1;

FIG. 6 is a detail in section of the releasable connection between the filter element and filter tank outlet of the present unit in its released position; and FIG. 7 is a top view of the filter unit with certain covers thereof removed.

Figures 1, 1A:
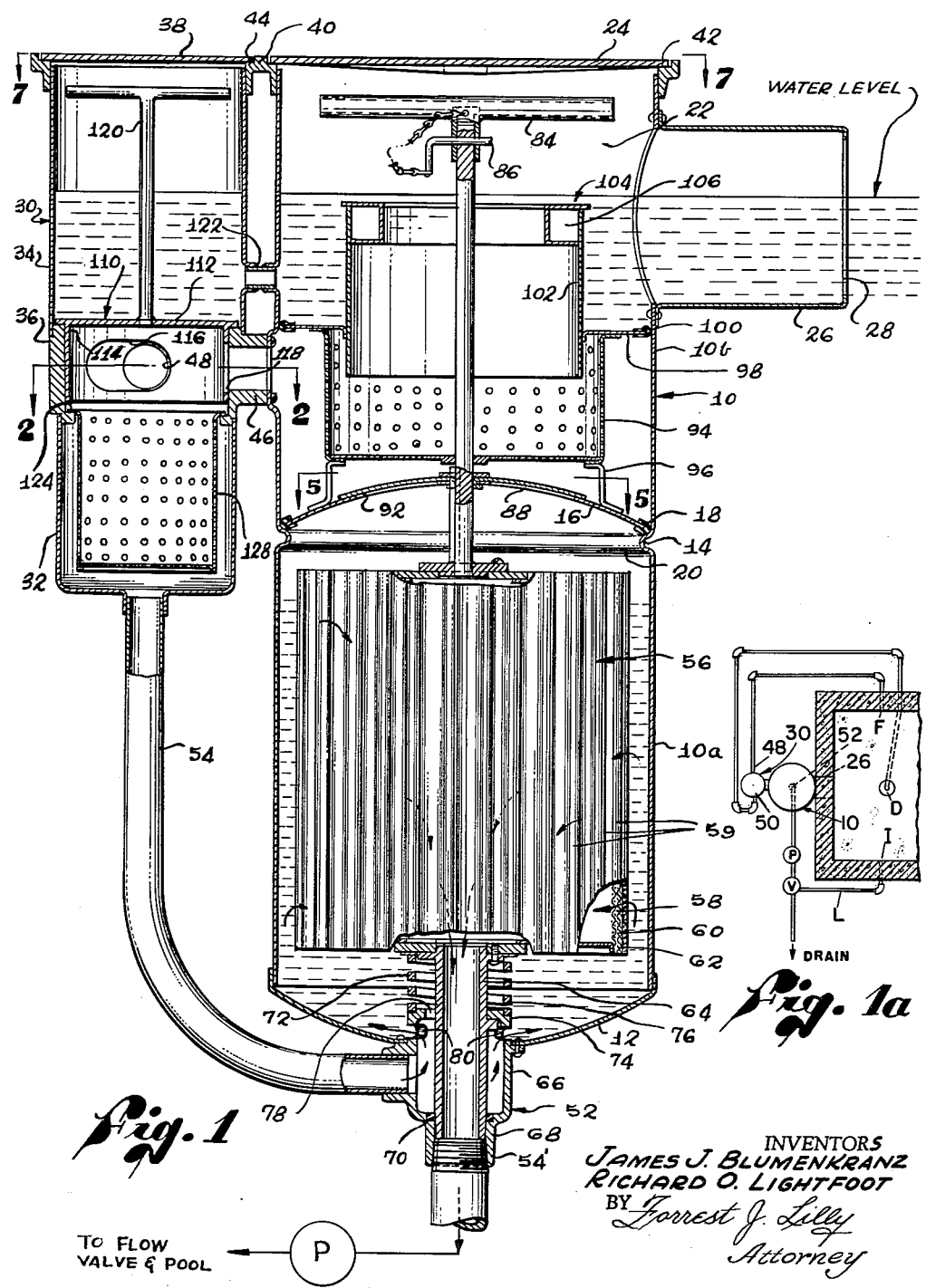
FIG. 1 is a section taken through the filter unit of this invention during a normal filtering operation.
FIG. 1a is a diagrammatic illustration of the present filter installed in a pool.

Referring now to these drawings, the present filter unit will be seen to comprise a single integral casing body including a large hollow, cylindrical casing 10 having a normally lower end wall 12. The casing 10 is circumferentially crimped intermediate its ends to form an internal annular shoulder 14.

Removably received in the casing is a dome-shaped partition 16. This partition carries a peripheral gasket 18 which rests on the shoulder 14 to form a suitably liquid-tight seal between the partition 16 and the casing 10. Partition 16 separates the interior of the casing 10 to a pair of lower and upper chambers 20 and 22.

The lower half 10a of the casing 10, below the partition 16, serves as, and will therefore hereinafter be referred to as, a filter tank. The upper half 10b of the casing 10 above the partition 16 is closed at its upper end by a removable cover 24 and comprises a collector tank for a surface skimmer. Extending radially from the upper casing 10b is a rectangular surface skimmer intake or inlet extension 26, having an inlet opening 28 communicating to the upper chamber 22.

Located at one side of the upper casing 10b is a smaller diameter casing 30 which comprises a part of the earlier mentioned common valve and strainer assembly. This smaller casing is made up of a lower cup-like shell 32, an upper cylindrical shell 34, and an intermediate annular valve body or sleeve 36 to which the shells 32 and 34 are rigidly joined. The upper end of the casing 30 is closed by a removable cover 38. In the illustrative filter unit, a casting 40, having a generally figure 8 configuration, is mounted on and joins the upper ends of the casings 10 and 30. This casting is vertically adjustable on the casings 10 and 30 to permit locating of the casting approximately flush with a pool deck when the unit is installed in a well in the deck. Casting 40 is formed with a pair of annular seats 42 and 44 for receiving the covers 24 and 38, as shown.

Valve body or sleeve 36 has three inlets 46, 48 and 50 to the chamber within the casing. Inlet 46 opens through the wall of the upper portion 10b of the large casing 10, a slight distance below the plane of the lower wall of the skimmer inlet extension 26. Inlets 46, 48 and 50 are spaced 90 degrees apart as may be observed most clearly in FIGS. 2–4.

Extending between the lower end of the casing 30 and a combined inlet and outlet fitting 52 on the lower end wall of the casing 10 is a conduit 54. Fitting 52, soon to be described, and conduit 54 communicate the interior of the casing 30 with the lower end of the lower chamber 20 in the casing 10. Fitting 52 has a lower threaded water outlet passage 54'.

When the present filter unit is installed in a swimming pool, it is placed in a well in the pool deck. The skimmer inlet extension 26 opens through the side wall of the pool at the normal water level. The outlet opening 54' of the fitting 52 is connected to the suction side of the filter pump system which includes valve means V for selectively connecting the discharge of the pump p to a waste facility or to an inlet fitting I on the pool side wall through a water line L. Finally, the inlets 48 and 50 on the casing 30 are connected, respectively, to the main outlet or drain D in the bottom of the pool and a vacuum fitting F in the pool side wall. This vacuum fitting is normally closed by a plug.

Located within the lower casing or filter tank 10a is a filter element 56. This filter element comprises a hollow screen mesh body 58 having a plurality of hollow vanes 59. Body 58 is covered with a permeable fabric material or membrane 60. When in use, the outside of the filter element is coated with a layer 62 of diatomaceous earth or other filter aid.

Rigidly fixed to the lower end of the filter element is an outlet stem or sleeve 64 which extends into the fitting 52. As shown most clearly in FIG. 1, this fitting comprises an upper enlarged sleeve portion 66 which projects above the lower end wall 12 of the casing 10 and a lower reduced sleeve portion 68 which defines the outlet passage 54' of the fitting. The upper end of the outlet passage has a smooth cylindrical wall and is proportioned to slideably receive the lower end of the outlet sleeve 64 on the filter element in the normal operative position of the latter, shown in FIGURE 1. An O-ring 70 provides a liquid-tight seal between the fitting 52 and the sleeve 64 under these conditions.

Acting between the lower end of the filter element 56 and the upper end of the fitting 52 is a coil spring 72. This spring acts to urge the filter element sleeve 64 upwardly out of the outlet passage 54'. The sleeve is releasably locked in the normal position against upward retraction out of the outlet opening by means of a bayonet-type coupling or lock. This lock includes a radial lug 74 on the sleeve which abuts an annular flange 76 on the upper end of the fitting 52. The lock may be released to permit retraction of the filter element to its position of FIG. 6 by rotating the element and its sleeve 64 to align the lug 74 with a radial slot 78 in the flange 76. As will shortly be seen, the bayonet lock is thus releasable to permit washing of the filter element.

As shown in the drawings, the lower end of the conduit 54 extending from the casing 30 opens to the interior of the enlarged portion 66 of the fitting 52. During normal operation of the filter unit, water flows through the conduit 54 into the annular space or water inlet passage between the filter element sleeve 64 and the enlarged portion 66 of the fitting 52. The water flows from this space to the interior 20 of the filter tank 10a through radial inlet ports 80 in the upper end of the fitting 52 and thence to the interior of the filter element 56. The filtered water flows from the filter element downwardly through the outlet sleeve 64 and outlet passage 54' to the filter pump p.

Fixed to and extending axially upward from the filter 56 into the upper chamber 22 of the casing 10 is a shaft 82. This shaft mounts a handle 84 at its upper end.

Handle 84 is releasably fixed to the shaft 82 by a removable cross pin 86.

Shaft 82 is both slideable and rotatable in the partition 16. Slideably keyed on the shaft 82 above the partition 16 is a dome-shaped valve plate 88. This valve plate has openings 90 (FIG. 5) which are alignable, by turning of the valve plate to a preselected position, with openings 92 in the partition 16. In the normal position of the valve plate, the openings 90 and 92 are misaligned. The valve plate then acts to seal the partition openings 92. The valve plate is adapted to be turned between these positions by the handle 84, as will be shortly described.

Located within the upper casing chamber 22 is a strainer basket 94. Fixed to the underside of this basket are a plurality of legs 96 which serve to support the basket on and in spaced relation to the partition 16. Basket 94 has an annular plate or flange 98 at its upper end located just below the bottom wall of the inlet extension 26. This flange has an outer diameter approximately the diameter of the chamber 22 and carries a peripheral seal ring 100 which forms a liquid-tight seal between the flange and wall of the chamber 22.

Slideably received in the central opening of the flange 98 is the cylindrical shell 102 of a surface skimmer 104. This surface skimmer is rendered buoyant in any convenient manner, as by an annular hollow chamber 106 at the upper end of the shell 102.

Located within the casing 30 is an inverted cup-like member 110 which forms the combined selector and proportioning valve of the invention. This valve comprises a circular top plate 112 which is rotatably supported on the upper annular edge of the valve sleeve 36 and a cylindrical side wall 114 which has a close sliding fit in the valve sleeve.

Valve 110 serves the two-fold purpose of a trim or proportioning valve for proportioning water flow to the casing 30 through the skimmer and pool inlets 46 and 48 and a selector valve for setting the filter unit for its several different modes of operation. To this end, the cylindrical side wall 114 of valve 110 is formed with a pair of circumferentially elongated openings 116 and 118 which are selectively alignable with the inlets 46, 48 and 50. A handle 120 is fixed to the valve for turning the same to its different positions.

In order to prevent leakage of air past the valve 110, the interior of the casing 30 above the valve communicates to the interior of the upper surface skimmer chamber 22 through a short conduit 122. During operation of the filter unit, water flows from chamber 22 through conduit 122 into the casing 30 above the valve 110 to form a reasonably air-tight seal between the valve and its sleeve 36.

Valve sleeve 36 has an internal annular flange 124 below the valve 110 on which is supported a strainer basket 128.

This completes the structural description of the present filter unit. Operation of the latter will now be discussed.

In normal operation of the unit, outlet sleeve 64 on the filter element 56 is locked in the filter tank outlet fitting 52 and valve plate 88 is in its closed position. Also, the selector and proportioning valve 110 is set in its position of FIG. 2 (or FIG. 3). In these positions the valve openings 116 and 118 are aligned with the surface skimmer and pool inlets 46 and 48. The vacuum fitting inlet 50 is closed, as shown.

When the filter pump p is operated, water adjacent the surface of the pool flows through the skimmer opening 28, over the surface skimmer 104, and through the strainer basket 94 into the space below annular plate 98. The skimmed water flows from this space through skimmer inlet 46 into the casing 30. Water is also drawn into the casing 30 through the pool inlet 48.

Water flows from the casing 30 through the strainer basket 128, and conduit 54 to the fitting 52 at the bottom of the filter tank 10a. Water flow is then around the filter element sleeve 64, through the radial ports 80, upwardly through the filter tank to the filter element 56, and finally through the permeable membrane of the latter to the filter pump p for return to the pool.

It is necessary, for the reasons discussed in the aforementioned application, Serial No. 733,110, to regulate or proportion the flow of water to the filter tank from the surface skimmer and main outlet. To this end, the valve openings 116 and 118 are so proportioned and located that the effective areas of the skimmer inlet 46 and pool inlet 48 may be varied by turning the valve 110, as indicated in FIGS. 2 and 3.

During a pool vacuuming operation, the selector and proportioning valve 110 is turned to its position of FIG. 4 wherein the skimmer and pool inlets 46 and 48 are closed and the vacuum fitting inlet 50 is open. When the filter pump is operated under these conditions with a pool cleaner attached to the vacuum fitting, water is drawn into the filter tank from the pool through the cleaner and then flows through the filter element 56 back to the pool in the manner described previously.

As preliminarily mentioned, it is necessary to periodically wash off the filter element 56. This is accomplished by turning the selector and proportioning valve 110 to the position of FIG. 4 and plugging the vacuum fitting. The handle 84 is then turned to release the bayonet lock between the filter element and outlet fitting 52, and the filter element is retracted to the position of FIG. 6. The valve plate 88 is so oriented on the shaft 82 that when the handle 84 is turned to release the filter element, the valve plate openings 90 become aligned with the partition openings 92.

When the filter pump is operated under these conditions, water flows from the surface skimmer through the openings 90 and 92 into the upper end of the filter tank. The water then flows downwardly through the tank, over the exterior of the filter element, through the outlet fitting ports 80 and past the now unseated end of the filter element sleeve 64 directly to the pump p which is now set to discharge to waste. The filter element is simultaneously moved about in the filter tank by means of the handle 84.

The combined action of water flowing over the filter element and movement of the latter causes separation of the dirty layer of filter aid and rinsing of the latter from the filter tank.

The strainer baskets 94 and 128 are removed for cleaning by removing the covers 24 and 38 and lifting the parts out of the respective casings. Handle 84 is removable from the shaft 82 for this purpose, by removing the cross pin 86.

A highly desirable and important feature of the invention resides in the upward direction of flow of water through the filter tank during normal and vacuuming operations. Thus, it will be observed that during both of these operations water discharges radially through the ports 80 into the filter tank along the bottom wall 12. The water then flows upwardly through the tank to the filter element 56.

As a result, filter aid which tends to separate from the filter element and settle to the bottom of the filter tank during inoperative periods of the filter unit is picked up by the water and redeposited on the filter element.

This redeposition action is highly desirable for two reasons. First, the length of the filter run (i.e., the period of time the element may be used without washing and recoating with filter aid) is appreciably prolonged. This is due to the fact that the relatively water impervious layer of foreign matter which forms on the outside of the layer of filter aid is periodically broken up, as previously discussed. In effect, therefore, the layer of filter aid is periodically reconditioned for more efficient filtering action.

This redepositing action also tends to maintain an optimum thickness of filter aid on the filter element.

Secondly, after washing off the filter element, a fresh layer of filter aid may be more effectively applied to the element by the introduction of fresh aid into the water flowing to the filter tank than with the conventional filter arrangements. This is because of the fact that any filter aid which does not adhere to the filter element of a conventional filter settles to and remains on the bottom of the filter tank since water flow in such a filter is in a downward direction. In the present filter unit, on the other hand, any filter aid which does not adhere to the filter element at first is picked up by the upwardly flowing water entering the filter tank and carried back to the filter element.

A second highly important feature of the invention resides in the novel selector and proportioning valve 110 which, as noted earlier, serves the twofold purpose of a metering or flow proportioning valve and selector valve. This single valve, therefore, takes the place of the separate surface skimmer and cut-off valves required in conventional filters of this general type. Also, the single strainer basket 128 serves all three skimmer, pool and vacuum inlets of the unit.

This single, dual-purpose valve, of course, appreciably simplifies the construction and operation of the present filter unit and reduces its cost. As to simplicity of operation, the upper face of the casting 40 may be provided with legends 130 and 132, as shown in FIG. 7, indicating the two positions of handle 84 for normal operation and filter washing operation and the three positions of handle 120 for normal operation, vacuuming operation and filter washing operation.

A third advantage of the present filter construction resides in the accessibility of the filter parts for removal from the filter casings. Removal of the parts is accomplished, as noted earlier, by removal of the casing covers 24 and 38.

It will be apparent, therefore, that there has been described and illustrated a filter unit which is fully capable of attaining the objects preliminarily set forth.

While a preferred embodiment of the invention has been disclosed for illustrative purposes, numerous modifications in design and arrangement of parts are possible within the scope of the following claims.

We claim:

1. A filter for a swimming pool having a water outlet comprising a collector tank and a filter tank, said collector tank having an inlet for communication with the surface water level of the pool and an outlet, surface skimming means in said collector tank between said collector tank inlet and said collector tank outlet, said filter tank having an inlet and an outlet, a filter element in said filter tank between said filter tank inlet and said filter tank outlet, a single selector and proportioning valve comprising a valve body having a first inlet connected to said collector tank outlet, a second inlet for connection to the pool outlet, and an outlet connected to said filter tank inlet, and an adjustable valve member in said valve body for selectively communicating said valve inlets to said valve outlet and proportioning water flow from said valve inlets to said valve outlet.

2. A filter for a swimming pool having an outlet, comprising a normally upright casing including a lower filter tank and a collector tank on the upper end of said filter tank, said collector tank having a lateral inlet for communication with the surface water level of the pool and an outlet, surface skimming means in said collector tank between said collector tank inlet and said collector tank outlet, said filter tank having an inlet and an outlet, a filter element in said filter tank between said filter tank inlet and said filter tank outlet, a selector and proportioning valve comprising a valve body attached to the upper end of said casing, said valve body having an inlet connected to said collector tank outlet, an inlet for connection to the pool outlet, and an outlet connected to said filter tank inlet, and an adjustable valve member in said valve body for selectively communicating said valve inlets to said valve outlet and proportioning flow of water from said valve inlets to said valve outlet.

3. The subject matter of claim 2 wherein said valve body comprises a second upright casing at one side of the first-mentioned casing, said second casing having a top opening through which said valve member is accessible for adjustment, and a removable cover closing said top opening.

4. The subject matter of claim 2 wherein said valve body comprises a first normally vertical valve sleeve, said valve inlets opening through the wall of said sleeve, and said valve member comprises a second sleeve rotatable in said first sleeve and having openings which can be aligned and misaligned with the inlet openings in said first sleeve by rotation of said second sleeve.

5. A filter for a swimming pool having a water outlet, comprising a first normally upright, cylindrical casing having a top opening, a removable cover closing said top opening, a partition within said casing dividing the latter into a lower filter tank and an upper collector tank, a second, vertical cylindrical valve casing mounted on one side of the upper end of said first casing, said collector tank having a lateral inlet for communication with the normal water level of a pool and an outlet opening through said partition to the filter tank, said valve casing having a first inlet communicating with said collector tank, a second inlet for connection to the pool outlet, and an outlet, said filter tank having an inlet in its lower end connected to said valve casing outlet and an outlet in the lower end of the filter tank, an adjustable valve member in said valve casing for selectively communicating and proportioning flow through said valve casing inlets to said valve casing outlet, said valve casing having an open top approximately flush with the top of said first casing through which said valve member is accessible for adjustment, a removable cover to close the top of said valve casing, a hollow permeable filter element in said filter tank having an outlet, means releasably coupling said filter element outlet to the filter tank outlet, a handle fixed to the element and extending through said partition for releasing and engaging said coupling means, and a valve member on said partition and operated by said handle to close said outlet in said partition when said coupling is engaged and open the latter outlet when said coupling is released.

6. A filter for a swimming pool, comprising a normally upright cylindrical filter tank having upper and lower end walls, a hollow permeable filter element in said tank adapted to be externally coated with a filter aid, a sleeve sealed to and extending coaxially through and above said lower tank wall and having radial discharge openings to the interior of the tank just above said lower tank wall, said sleeve being open at opposite ends and the wall of said sleeve having an inlet passage through which water can flow into the sleeve, said filter element comprising an axial stem which extends through and has one end slidably fitted in the lower end of said sleeve, said stem having a central passage communicating to the interior of the element and opening through said end of the stem, and there being a space between the stem and sleeve through which water can flow from said inlet passage in the sleeve to said radial discharge openings in the upper end of the sleeve.

7. A filter assembly for a swimming pool having an outlet, comprising a normally upright filter tank having an inlet and an outlet in its lower end, a collector tank on the upper end of said filter tank having an inlet for communication with the surface water level of the pool and an outlet, surface skimming means in said collector tank between said collector tank inlet and said collector tank outlet, first valve means having an inlet connected to said collector tank outlet, a second inlet for connection to the pool outlet, and an outlet connected to said filter tank inlet, said valve means including means for selectively blocking water flow from said inlets of said valve means to said outlet of said valve means, there being a passage communicating said collector tank to the upper end of said filter tank, second valve means for selectively closing said passage, a hollow permeable filter element within said filter tank having an outlet, means releasably coupling said filter element outlet to said filter tank outlet, said collector tank having a top opening, and means accessible through said top opening for selectively releasing said coupling means to provide direct communication between the interior of said filter tank and said filter tank outlet and for operating said second valve means to open and close the latter valve means.

8. A filter assembly for a swimming pool having an outlet, comprising a normally upright casing having a lower end wall, a partition within said casing dividing the latter into a lower filter tank and an upper collector tank, said casing having a first lateral inlet to said collector tank for communication with the surface water level of the pool, an outlet from said collector tank, an inlet to said filter tank in said lower end wall, and an outlet from said filter tank in said lower end wall, said partition having an opening communicating said collector tank to the upper end of said filter tank, a first valve on said partition for selectively opening and closing said opening, a second valve on said casing having a first inlet connected to said collector tank outlet, a second inlet for connection to the pool outlet, and an outlet connected to said filter tank inlet, said second valve including means for selectively blocking water flow from said valve inlets to said valve outlet, surface skimming means in said collector tank between said collector tank inlet and said collector tank outlet, a hollow permeable filter element within said filter tank having an outlet, rotatably releasable and engageable means coupling said filter element outlet to said filter tank outlet, a handle secured to said filter element and extending through said partition into said collector tank for rotating said element to release and engage said coupling means and move said element about in said filter tank when said coupling means are released, said collector tank having an open top through which said handle is accessible, and a connection between said handle and first valve whereby the latter is opened by rotation of said handle to release said coupling means and closed by rotation of said handle to engage said coupling means.

9. A filter assembly for a swimming pool having an outlet, comprising a normally upright casing having a lower end wall, a partition within said casing dividing the latter into a lower filter tank and an upper collector tank, said casing having a first lateral inlet to said collector tank for communication with the surface water level of the pool, an outlet from said collector tank, an inlet to said filter tank in said lower end wall, and an outlet from said filter tank in said lower end wall, said partition having an opening communicating said collector tank to the upper end of said filter tank, a rotatable valve plate on said partition for selectively opening and closing said opening, a valve on said casing having a first inlet connected to said collector tank outlet, a second inlet for connection to the pool outlet, and an outlet connected to said filter tank inlet, said valve including means for selectively blocking water flow from said valve inlets to said valve outlet, surface skimming means in said collector tank between said collector tank inlet and said collector tank outlet, a hollow permeable filter element within said filter tank having an outlet, rotatably releasable and engageable means coupling said filter element outlet to said filter tank outlet, a handle secured to said filter element and extending through said partition into said collector tank for rotating said element to release and engage said coupling means and move said element about in said filter tank when said coupling means are released, said collector tank having an open top through which said handle is accessible, and a connection between said handle and valve plate whereby the latter is opened by rotation of said handle to release said coupling means and closed by rotation of said handle to engage said coupling means.

References Cited in the file of this patent

UNITED STATES PATENTS

| | | |
|---|---|---|
| 86,158 | Houston | Jan. 26, 1869 |
| 614,351 | Sieber | Nov. 15, 1898 |
| 789,617 | Linke | May 9, 1905 |
| 881,228 | Dyblie | Mar. 10, 1908 |
| 1,214,747 | Betker | Feb. 6, 1917 |
| 1,750,185 | McGeehan et al. | Mar. 11, 1930 |
| 1,982,376 | De Lancey | Nov. 27, 1934 |
| 2,502,052 | Landon et al. | Mar. 28, 1950 |
| 2,503,639 | Snyder | Apr. 11, 1950 |
| 2,627,351 | Ogden | Feb. 3, 1953 |
| 2,701,235 | King | Feb. 1, 1955 |
| 2,809,752 | Leslie | Oct. 15, 1957 |
| 2,844,255 | Cavenah et al. | July 22, 1958 |
| 2,979,206 | Konopka et al. | Apr. 11, 1961 |